(12) United States Patent
Liang et al.

(10) Patent No.: US 9,415,347 B2
(45) Date of Patent: Aug. 16, 2016

(54) ASYMMETRIC MEMBRANES

(71) Applicant: Pall Corporation, Port Washington, NY (US)

(72) Inventors: Xuemei Liang, Pensacola, FL (US); Mark Murla, Pensacola, FL (US); Binbing Han, Pensacola, FL (US); Donald Simonton, Gulf Breeze, FL (US); Richard Morris, Pensacola, FL (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 14/635,228

(22) Filed: Mar. 2, 2015

(65) Prior Publication Data
US 2015/0190756 A1    Jul. 9, 2015

Related U.S. Application Data

(63) Continuation of application No. 13/363,793, filed on Feb. 1, 2012, now Pat. No. 9,005,496.

(51) Int. Cl.
*B01D 39/00* (2006.01)
*B01D 39/14* (2006.01)
*B01D 61/00* (2006.01)
(Continued)

(52) U.S. Cl.
CPC ............ *B01D 69/02* (2013.01); *B01D 67/0013* (2013.01); *B01D 67/0016* (2013.01); *B01D 69/12* (2013.01); *B01D 71/68* (2013.01); *B01D 71/34* (2013.01); *B01D 2323/08* (2013.01); *B01D 2323/18* (2013.01); *B01D 2323/42* (2013.01); *B01D 2325/02* (2013.01); *B01D 2325/022* (2013.01); *B01D 2325/04* (2013.01)

(58) Field of Classification Search
CPC .. B01D 69/02; B01D 71/68; B01D 2325/022; B01D 69/06; B01D 2325/20; B01D 71/56; B01D 61/147; B01D 63/081; C02F 1/444
See application file for complete search history.

(56) References Cited

U.S. PATENT DOCUMENTS

| | | | |
|---|---|---|---|
| 4,340,479 A | 7/1982 | Pall | |
| 4,629,563 A | 12/1986 | Wrasidlo | |

(Continued)

FOREIGN PATENT DOCUMENTS

| | | |
|---|---|---|
| DE | 195 43 055 B4 | 9/1996 |
| EP | 0 413 552 A1 | 2/1991 |

(Continued)

OTHER PUBLICATIONS

European Patent Office, Extended Search Report in EP Patent Application No. 13 15 1844 (Jun. 3, 2013).

(Continued)

*Primary Examiner* — Ana Fortuna
(74) *Attorney, Agent, or Firm* — Jeremy Jay

(57) ABSTRACT

Asymmetric membranes comprising a first asymmetric porous zone including a first porous asymmetry that increases from the first exterior surface through the first porous zone of the bulk, and a second asymmetric porous zone including a second porous asymmetry that increases from the second exterior surface through the second porous zone of the bulk, wherein the first average pore size is larger than the second average pore size, as well as methods of making and using the membranes, are disclosed.

10 Claims, 7 Drawing Sheets

(51) Int. Cl.
*C02F 1/44* (2006.01)
*B01D 69/02* (2006.01)
*B01D 67/00* (2006.01)
*B01D 69/12* (2006.01)
*B01D 71/68* (2006.01)
*B01D 71/34* (2006.01)

(56) References Cited

U.S. PATENT DOCUMENTS

| | | | |
|---|---|---|---|
| 4,882,223 A * | 11/1989 | Aptel | A23C 9/1422 210/500.22 |
| 4,925,572 A | 5/1990 | Pall | |
| 4,933,081 A * | 6/1990 | Sasaki | B01D 67/0009 210/490 |
| 4,964,990 A | 10/1990 | Kraus et al. | |
| 5,152,905 A | 10/1992 | Pall et al. | |
| 5,188,734 A | 2/1993 | Zepf | |
| 5,228,994 A | 7/1993 | Tkacik et al. | |
| 5,443,743 A | 8/1995 | Gsell | |
| 5,472,621 A | 12/1995 | Matkovich et al. | |
| 5,620,790 A | 4/1997 | Holzki et al. | |
| 5,846,422 A | 12/1998 | Ditter et al. | |
| 5,906,742 A | 5/1999 | Wang et al. | |
| 5,928,774 A | 7/1999 | Wang et al. | |
| 5,979,670 A * | 11/1999 | Ditter | B01D 61/14 210/489 |
| 6,045,899 A | 4/2000 | Wang et al. | |
| 6,056,529 A | 5/2000 | Meyering et al. | |
| 6,074,869 A | 6/2000 | Pall et al. | |
| 6,146,747 A | 11/2000 | Wang et al. | |
| 6,183,640 B1 | 2/2001 | Wang | |
| 6,375,876 B1 | 4/2002 | Kessler et al. | |
| 6,413,070 B1 | 7/2002 | Meyering et al. | |
| 6,513,666 B2 | 2/2003 | Meyering et al. | |
| 6,706,184 B2 | 3/2004 | Sale et al. | |
| 6,736,912 B1 * | 5/2004 | Fields | C06B 45/10 149/19.1 |
| 6,884,375 B2 | 4/2005 | Wang et al. | |
| 6,944,811 B2 * | 9/2005 | Hojat | G06F 17/5022 714/744 |
| 6,994,811 B2 | 2/2006 | Kools | |
| 7,125,493 B2 | 10/2006 | Wang et al. | |
| 7,208,200 B2 * | 4/2007 | Kools | B01D 67/0009 210/490 |
| 7,229,665 B2 * | 6/2007 | Kools | B01D 67/0009 264/173.16 |
| 7,560,024 B2 * | 7/2009 | Kools | B01D 67/0009 210/500.21 |
| 7,560,025 B2 * | 7/2009 | Kools | B01D 67/0009 210/490 |
| 7,743,929 B2 | 6/2010 | Kools | |
| 7,842,214 B2 | 11/2010 | Romdhane et al. | |
| 7,891,500 B2 * | 2/2011 | Kools | B01D 67/0009 210/490 |
| 8,061,532 B2 | 11/2011 | Kools | |
| 8,181,792 B2 | 5/2012 | Kools | |
| 2002/0127387 A1 | 9/2002 | Sale et al. | |
| 2003/0209485 A1 | 11/2003 | Kools | |
| 2004/0050788 A1 | 3/2004 | Gorsuch et al. | |
| 2004/0154978 A1 | 8/2004 | Sale et al. | |
| 2005/0121384 A1 | 6/2005 | Gorsuch et al. | |
| 2006/0180543 A1 | 8/2006 | Kools | |
| 2009/0110900 A1 | 4/2009 | Yokota et al. | |
| 2010/0224553 A1 | 9/2010 | Ansorge et al. | |
| 2010/0230843 A1 | 9/2010 | Ansorge et al. | |
| 2010/0243556 A1 | 9/2010 | Kools et al. | |

FOREIGN PATENT DOCUMENTS

| | | |
|---|---|---|
| EP | 2 022 555 A1 | 2/2009 |
| EP | 2163296 A1 | 3/2010 |
| EP | 2 383 031 A1 | 11/2011 |
| JP | 2002-535114 A | 10/2002 |
| JP | 2003-530984 A | 10/2003 |
| JP | 2003-534408 A | 11/2003 |
| JP | 2007-289886 A | 11/2007 |
| JP | 2007-296525 A | 11/2007 |
| WO | WO 96/40871 A | 12/1996 |
| WO | WO 01/89673 A2 | 11/2001 |
| WO | WO 0189673 A2 | 11/2001 |
| WO | WO 2010/144057 A1 | 12/2010 |

OTHER PUBLICATIONS

Singapore Search Report in Patent Application No. 201300105-2 Jun. 20, 2013.
Further Examination Report, NZ Application No. 606407, dated Oct. 25, 2013.
Patent Examination Report, Australian Application No. 2013200495, dated Oct. 16, 2013.
Notice of Reasons for Rejection, Japanese Application No. P2013-018536, dated Feb. 4, 2014.

* cited by examiner

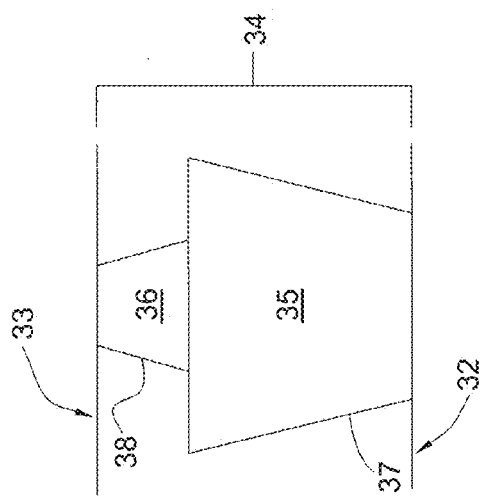
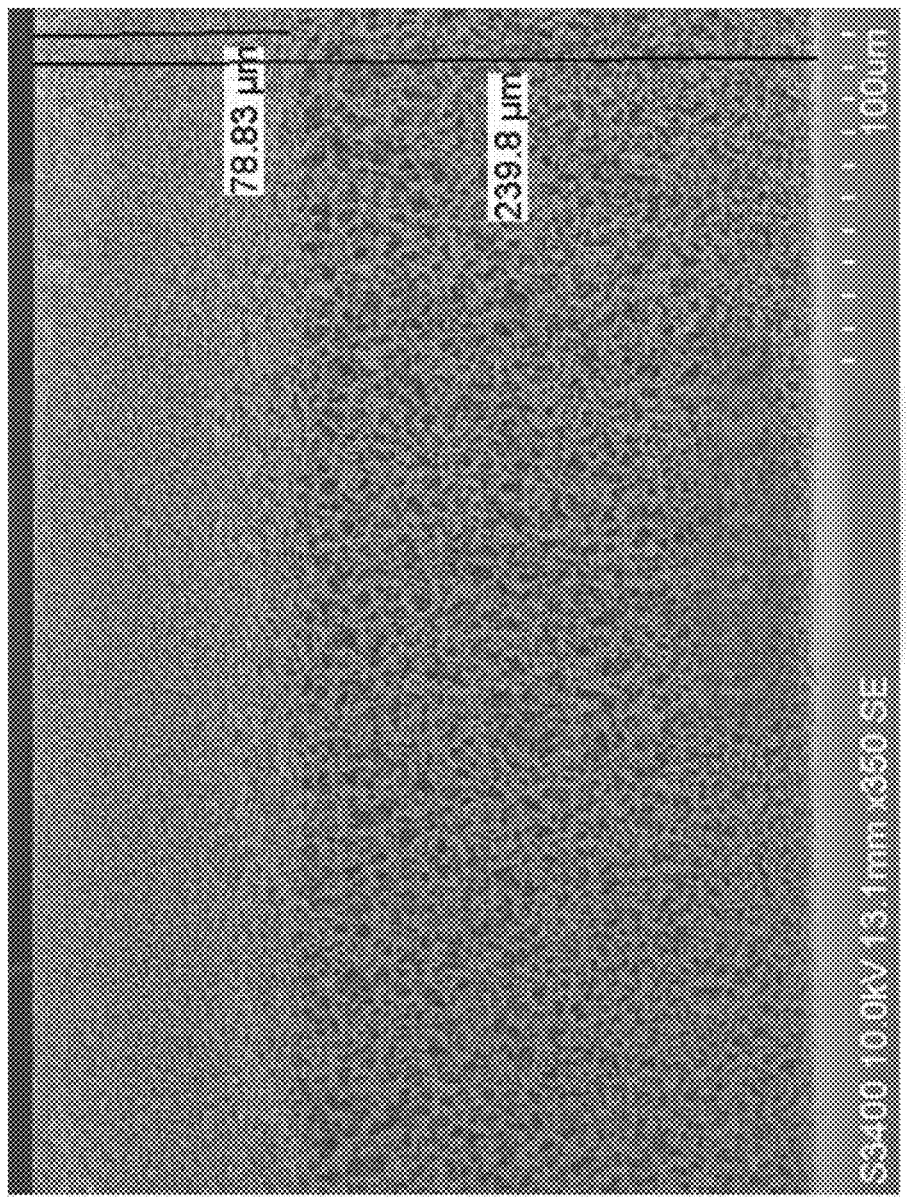
FIG. 2B
FIG. 2A

ASYMMETRIC MEMBRANES

CROSS-REFERENCE TO RELATED APPLICATIONS

This application is a continuation of U.S. patent application Ser. No. 13/363,793, filed on Feb. 1, 2012, which is incorporated by reference in its entirety herein.

BACKGROUND OF THE INVENTION

Asymmetric membranes having a large pore size on the upstream surface, a smaller pore size on the downstream surface, and an average pore size that decreases from the upstream surface in a direction toward the downstream surface (such membranes can be referred to as having a "V-shaped pore structure") are known in the art. However, conventional asymmetric membranes may exhibit reduced performance, capacity, and lifespan.

Accordingly, there is a need for improved asymmetric membranes.

BRIEF SUMMARY OF THE INVENTION

In accordance with an embodiment of the invention, an asymmetric membrane is provided comprising (a) a first exterior porous surface; (b) a second exterior porous surface; (c) a porous bulk between the first exterior porous surface and the second exterior porous surface, the porous bulk having a first porous region and a second porous region, the first porous region contacting the second porous region; (d) a first asymmetric porous zone, the first asymmetric porous zone including the first exterior surface, and extending into, and including, the first porous region of the bulk; and, (e) a second asymmetric porous zone, the second asymmetric porous zone including the second exterior surface, and extending into, and including, the second porous region of the bulk; wherein the first asymmetric porous zone includes a first porous asymmetry that increases from the first exterior surface through the first porous zone of the bulk, and the second asymmetric porous zone includes a second porous asymmetry that increases from the second exterior surface through the second porous zone of the bulk, and the first porous surface has a first average pore size and the second porous surface has a second average pore size, wherein the first average pore size is larger than the second average pore size.

Another embodiment of the invention provides a membrane comprising a first, upstream zone comprising pores, an upstream portion, and a downstream portion; and a second, downstream zone comprising pores, an upstream portion, and a downstream portion, wherein the pores of the first zone have an average pore size that increases in an upstream to downstream direction, the pores of the second zone have an average pore size that increases in a downstream to upstream direction, the downstream portion of the first zone has an average pore size that is greater than an average pore size of the upstream portion of the first zone and greater than an average pore size of an upstream portion of the second zone, and the average pore size of the first zone is greater than the average pore size of the second zone.

Other embodiments of the invention provide methods of making the inventive asymmetric membrane and methods of processing a fluid using the inventive asymmetric membrane.

BRIEF DESCRIPTION OF THE SEVERAL VIEWS OF THE DRAWING(S)

FIG. 2A is a scanning electron microscope (SEM) photograph of a vertical cross-section of an embodiment of a membrane according to the invention comprising polyethersulfone (PES).

FIG. 2B shows a diagrammatic cross-sectional representation of the pore structure of a membrane according to an embodiment of the invention, illustrating (a) a first exterior porous surface; (b) a second exterior porous surface; (c) a porous bulk between the first exterior porous surface and the second exterior porous surface, the porous bulk having a first porous region and a second porous region; (d) a first asymmetric porous zone; and, (e) a second asymmetric porous zone.

Figure 3:
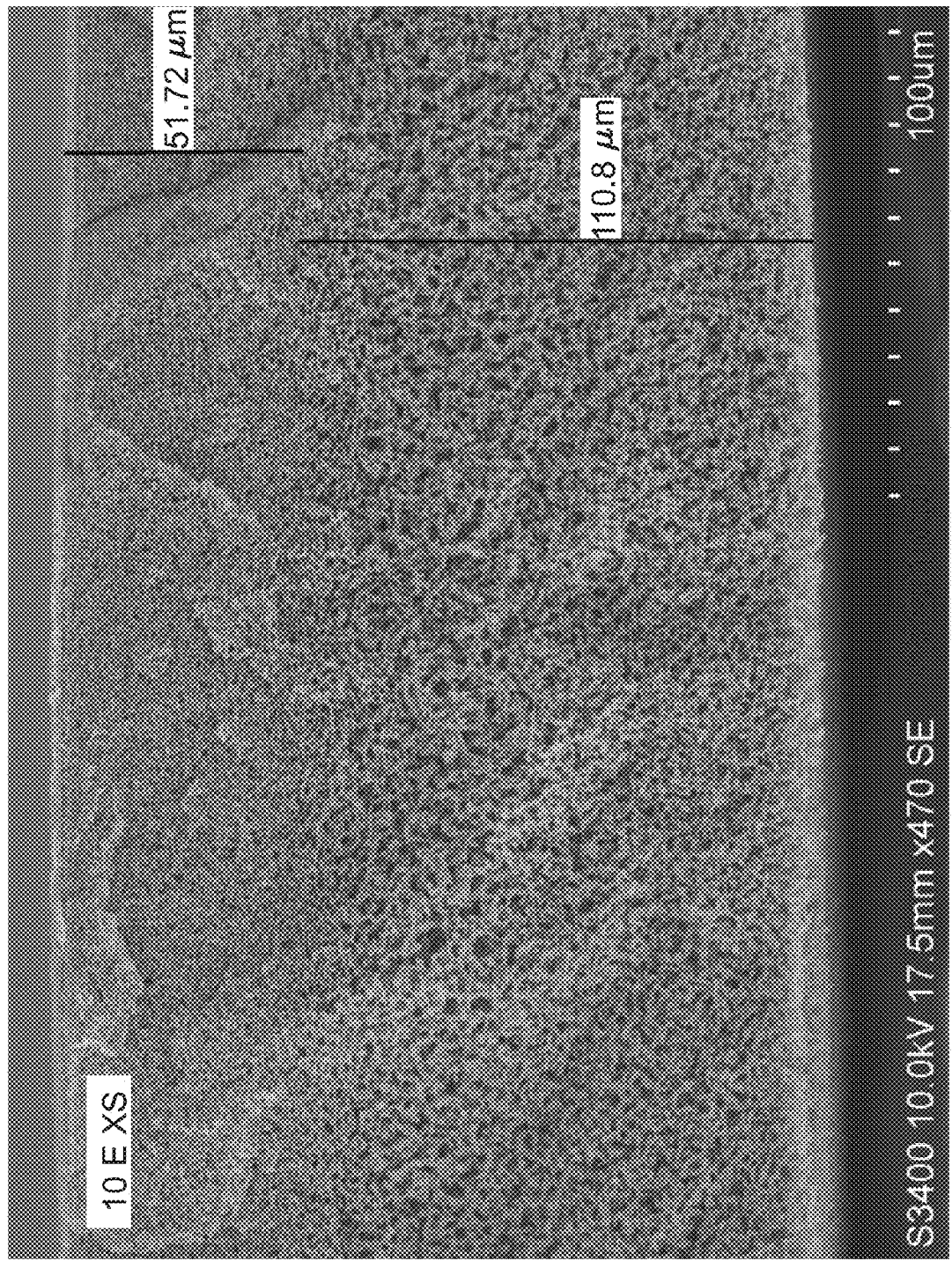

FIG. 3 is a SEM photograph of a vertical cross-section of another embodiment of a membrane according to the invention.

Figure 4A:
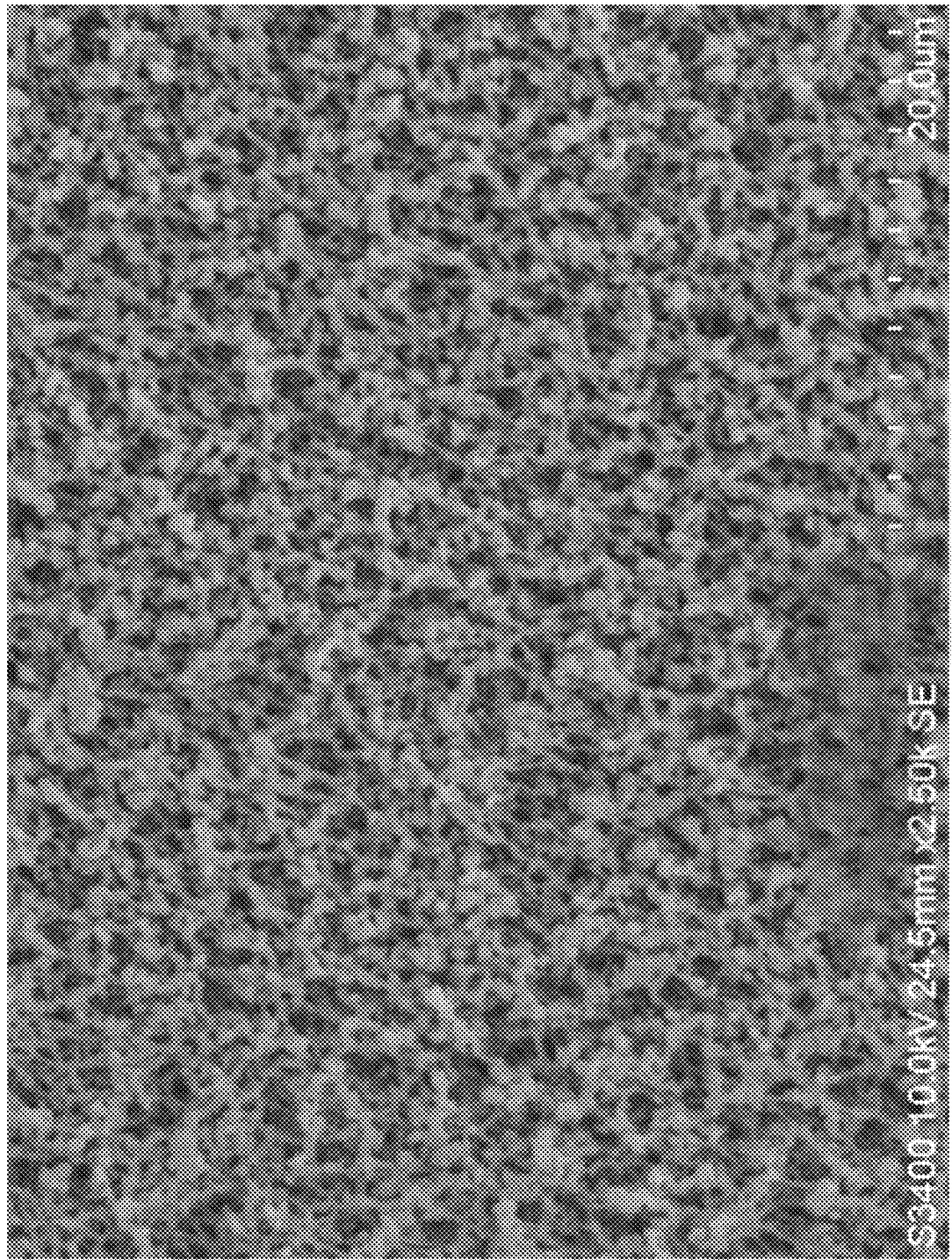

FIG. 4A is an enlarged SEM photograph of the lateral, second exterior surface of a membrane according to the invention.

Figure 4B:
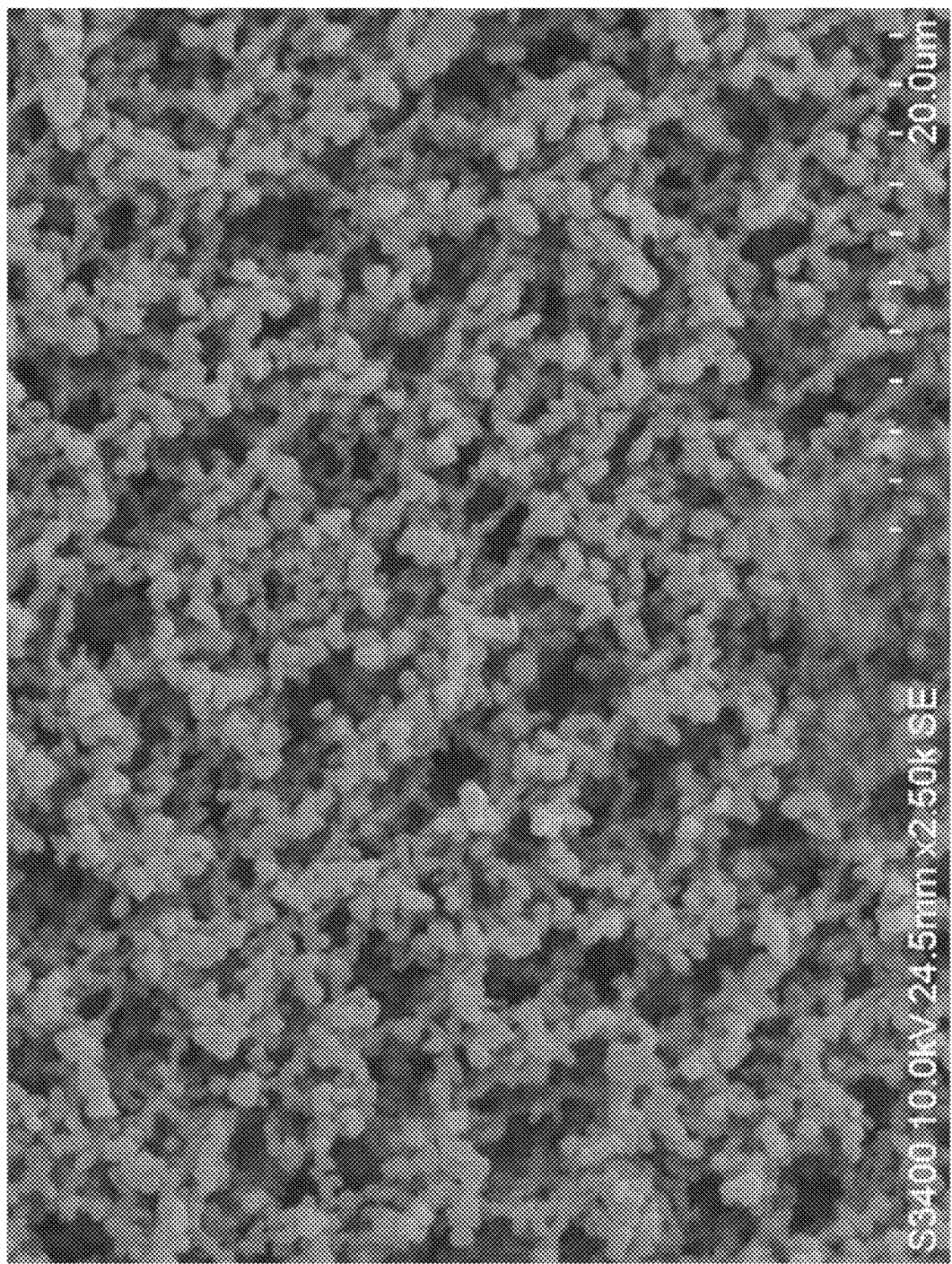

FIG. 4B is an enlarged SEM photograph of the lateral, first exterior surface of a membrane according to the invention.

Figure 5B:
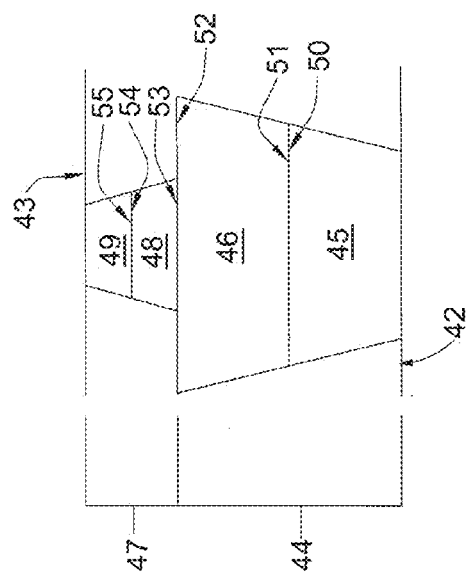
Figure 5A:
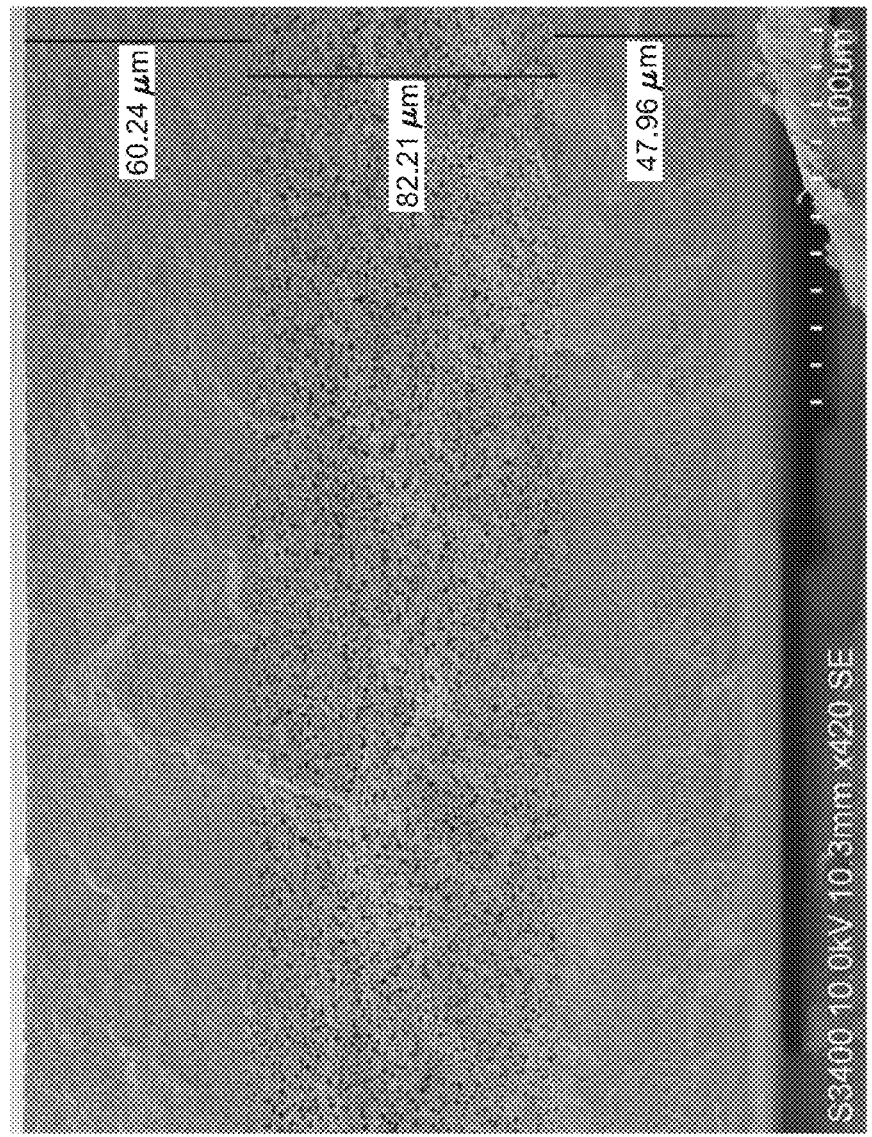

FIG. 5A is a SEM photograph of a vertical cross-section of an embodiment of a membrane according to the invention comprising polyvinylidene fluoride (PVDF).

FIG. 5B shows a diagrammatic cross-sectional representation of the pore structure of a membrane according to an embodiment of the invention, illustrating a first, upstream zone comprising an upstream portion, and a downstream portion; and a second, downstream zone comprising an upstream portion, and a downstream portion.

Figure 6B:
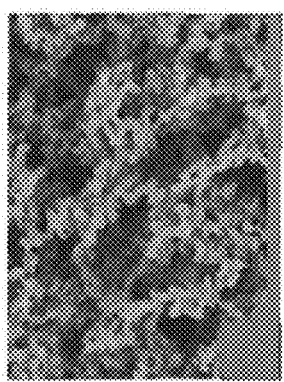
Figure 6C:
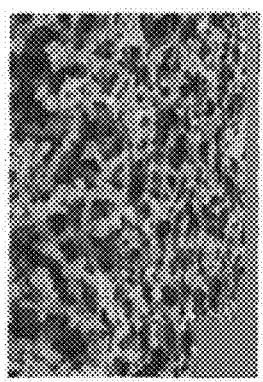
Figure 6D:
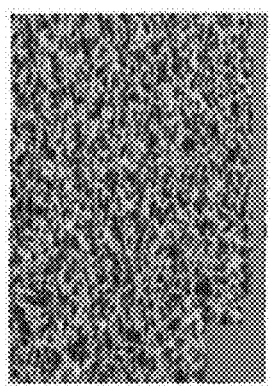
Figure 6A:
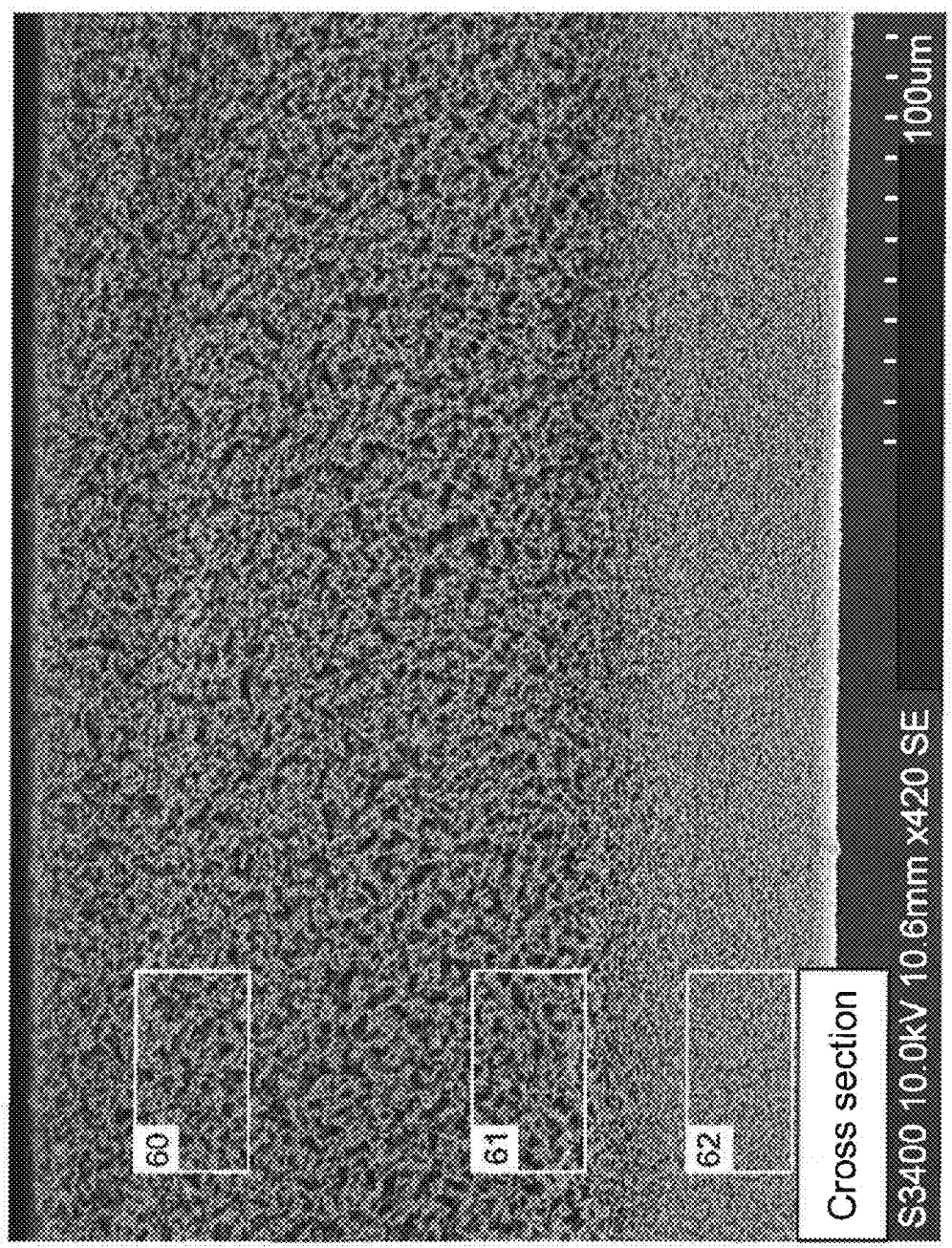

FIG. 6A is a SEM photograph of a vertical cross-section of another embodiment of a membrane according to the invention.

FIGS. 6B-6D are enlarged SEM photographs of the vertical cross section of the membrane of FIG. 6A at areas 60-62, respectively.

DETAILED DESCRIPTION OF THE INVENTION

Advantageously, membranes according to the invention exhibit reduced fouling and provide increased performance, capacity, and lifespan as compared to conventional asymmetric membranes with V-shaped pore structures. Without being bound to any particular theory, it is believed that a reduced number of large or medium-sized retentate particles pass through the pores of the surface of the first zone (e.g., the upstream surface) thus reducing the presence of retentate particles that could block the pores of the interior (i.e., downstream portion of the first zone) of membranes according to the invention. Since the average pore size of the downstream portion of the first zone is preferably greater than the average pore size of the upstream portion of the first zone and is also greater than the average pore size of the upstream portion of the second zone, the membranes can advantageously provide more space in the interior of the membrane for retentate particles (e.g., small retentate particles) and filtrate. Because the average pore size of the second zone is smaller than the average pore size of the first zone, a reduced number of retentate particles (e.g., small retentate particles) pass through the pores of the surface of the second zone (e.g., the downstream surface), and the filtrate passes through the pores of the surface of the second zone.

In accordance with an embodiment of the invention, with reference to the pore structure shown in diagrammatic FIG. 2B, an asymmetric membrane is provided comprising (a) a first exterior porous surface 32; (b) a second exterior porous surface 33; (c) a porous bulk 34 between the first exterior porous surface and the second exterior porous surface, the porous bulk 34 having a first porous region 35 and a second porous region 36, the first porous region 35 contacting the second porous region 36; (d) a first asymmetric porous zone 37, the first asymmetric porous zone 37 including the first exterior surface 32, and extending into, and including, the first porous region 35 of the bulk 34; and, (e) a second asymmetric porous zone 38, the second asymmetric porous zone 38 including the second exterior surface 33, and extending into, and including, the second porous region 36 of the bulk 34; wherein the first asymmetric porous zone 37 includes a first porous asymmetry that increases from the first exterior surface 32 through the first porous region 35 of the bulk 34, and the second asymmetric porous zone 38 includes a second porous asymmetry that increases from the second exterior surface 33 through the second porous region 36 of the bulk 34, and the first porous surface 32 has a first average pore size and the second porous surface 33 has a second average pore size, wherein the first average pore size is larger than the second average pore size.

In accordance with an embodiment of the invention, the membrane comprises a first exterior porous surface and a second exterior porous surface. With respect to fluid flow in accordance with an embodiment of the invention, the first exterior porous surface is an upstream surface and the second exterior porous surface is a downstream surface. In an alternative embodiment, the first exterior porous surface is a downstream surface and the second exterior porous surface is an upstream surface.

In accordance with an embodiment of the invention, the membrane comprises a porous bulk between the first exterior porous surface and the second exterior porous surface. The porous bulk may have a first porous region and a second porous region. With respect to fluid flow in accordance with an embodiment of the invention of the invention, the first porous region is an upstream region and the second porous region is a downstream region. In an alternative embodiment, the first porous region is a downstream region and the second porous region is an upstream region.

In accordance with an embodiment of the invention, the membrane comprises a first asymmetric porous zone and a second asymmetric porous zone. With respect to fluid flow in accordance with an embodiment of the invention, the first asymmetric porous zone is an upstream zone and the second asymmetric porous zone is a downstream zone. In an alternative embodiment, the first asymmetric porous zone is a downstream zone and the second asymmetric porous zone is an upstream zone. The first asymmetric porous zone may include the first exterior surface and may extend into, and include, the first porous region of the bulk. The second asymmetric porous zone may include the second exterior surface and may extend into, and include, the second porous region of the bulk.

The first zone of the membrane may have any suitable thickness. In accordance with an embodiment of the invention, the first zone of the membrane may have a thickness in the range of from less than about 10 micrometers ($\mu$m) to greater than about 250 $\mu$m, from about 10 $\mu$m to about 250 $\mu$m, or from about 100 $\mu$m to about 200 $\mu$m. The first zone of the membrane may, for example, comprise from about 5% (or less) to about 95% (or more), from about 15% to about 85%, from about 30% to about 70%, or from about 45% to about 55%, of the total thickness of the membrane.

The second zone of the membrane may have any suitable thickness. The second zone of the membrane may have a thickness in the range of about 10 $\mu$m (or less) to about 400 $\mu$m (or more), or from about 30 $\mu$m to about 100 $\mu$m. The second zone of the membrane may, for example, comprise from about 4% (or less) to about 85% (or more), from about 10% to about 80%, from about 20% to about 70%, or from about 40% to about 50%, of the total thickness of the membrane.

In accordance with an embodiment of the invention, the first asymmetric porous zone includes a first porous asymmetry that increases from the first exterior surface through the first porous region of the bulk. In accordance with an embodiment of the invention, the second asymmetric porous zone includes a second porous asymmetry that increases from the second exterior surface through the second porous zone of the region.

In this regard, the membrane, including the zones and regions therein, is asymmetric. "Asymmetric," as used herein, refers to a change in average pore structure across a cross-section (e.g., a vertical cross-section) of the membrane itself or a given zone of the membrane. An asymmetric membrane or zone has an average pore structure (typically, an average pore size) varying throughout the membrane or zone. Typically, the average pore size decreases in size from one portion or surface to another portion or surface (e.g., the average pore size decreases from the upstream portion or surface to the downstream portion or surface). However, other types of asymmetry are encompassed by embodiments of the invention, e.g., the pore size goes through a minimum pore size at a position within the thickness of the asymmetric zone. The pores of the first asymmetric porous zone and/or the second asymmetric porous zone may have an average pore size that increases in a direction, e.g., an upstream to downstream direction, a downstream to upstream direction, a first exterior porous surface to a second exterior porous surface direction, or a second exterior porous surface to a first exterior porous surface direction. In this regard, each of the first and second zones of the membrane may be asymmetric. The membrane, including zones, regions, and portions thereof, can have any suitable pore size gradient or ratio, e.g, about 1.1 or less, or about 100.0 or more, from about 1.1 to about 100.0, from about 5.0 to about 95.0, from about 10.0 to about 90.0, from about 15.0 to about 85.0, from about 20.0 to about 80.0, from about 25.0 to about 75.0, from about 30.0 to about 70.0, from about 35.0 to about 65.0, from about 40.0 to about 60.0, from about 1.1 to about 10.0, from about 2.0 to about 10.0, or from about 1.1 to about 5.0. This asymmetry can be measured by comparing the average pore size on one major surface of a zone with the average pore size of the other major surface of that zone.

In accordance with an embodiment of the invention, the first porous surface has a first average pore size and the second porous surface has a second average pore size. In accordance with an embodiment of the invention, the first average pore size is larger than the second average pore size. In an alternative embodiment, the second average pore size is larger than the first average pore size. The first and second porous surfaces may each have any suitable average pore size. In accordance with an embodiment of the invention, the first porous surface may have an average pore size from less than about 0.2 $\mu$m to greater than about 10.0 $\mu$m, from 0.2 $\mu$m to about 10.0 $\mu$m, from about 0.5 $\mu$m to about 9.0 $\mu$m, from about 1.0 $\mu$m to about 8.0 $\mu$m, from about 3.0 $\mu$m to about 7.0 $\mu$m, or from about 4.0 $\mu$m to about 6.0 $\mu$m. In accordance with an embodiment of the invention, the second porous surface may have an average pore size from less than about 0.01 $\mu$m to greater than about 5.0 $\mu$m, from about 0.01 $\mu$m to about 5.0 $\mu$m, from about 0.05 $\mu$m to about 4.0 $\mu$m, from about 0.10 $\mu$m to about 3.0 µm, from about 0.20 µm to about 2.0 µm, from about 0.3 µm to about 1.5 µm, or from about 0.4 µm to about 1.0 µm.

In accordance with an embodiment of the invention, the first porous region or first asymmetric porous zone has a first average pore size and the second porous region or second asymmetric porous zone has a second average pore size. The average pore size of the first porous region or first asymmetric porous zone can be larger than the average pore size of the second porous region or second asymmetric porous zone, or the average pore size of the second porous region or second asymmetric porous zone can be larger than the average pore size of the first porous region or first asymmetric porous zone. In accordance with an embodiment, the average pore size of the first porous region or first asymmetric porous zone is as described for that of the first porous surface. In accordance with an embodiment of the invention, the average pore size of the second porous region or second asymmetric porous zone is as described for that of the second porous surface.

The average pore sizes of the membrane, first and second surfaces, first and second zones, and first and second regions, may be selected as appropriate for the particular application.

In accordance with an embodiment of the invention, the first porous region or zone contacts the second porous region or zone. In this regard, the membrane is preferably continuous. A continuous membrane provides a continuum between the two zones or regions of the membrane and no break exists between the polymer structure which comprises the first and second regions or first and second zones of the membrane. The pores of the first region or first zone may interconnect with one another and with the pores of the second region or second zone. The pores of the second region or second zone may also interconnect with one another and with the pores of the first region or first zone.

With reference to the diagrammatic pore structure shown in FIG. 5B, another embodiment of the invention provides a membrane comprising a first, upstream zone 44 comprising pores, an upstream portion 45, and a downstream portion 46; and a second, downstream zone 47 comprising pores, an upstream portion 48, and a downstream portion 49, wherein the pores of the first zone 44 have an average pore size that increases in an upstream to downstream direction, the pores of the second zone 47 have an average pore size that increases in a downstream to upstream direction, the downstream portion 46 of the first zone has an average pore size that is greater than an average pore size of the upstream portion 45 of the first zone 44 and greater than an average pore size of an upstream portion 48 of the second zone 47, and the average pore size of the first zone 44 is greater than the average pore size of the second zone 47.

In accordance with an embodiment of the invention, the membrane comprises a first, upstream zone 44 comprising pores, an upstream portion 45, and a downstream portion 46. The first zone 44 may also comprise an upstream surface 42 of the membrane and a downstream boundary 52, each of which may be porous. The downstream boundary 52 of the first zone 44 of the membrane may be positioned in the interior of the membrane and adjacent to the upstream boundary 53 of the second zone 47 of the membrane, which is explained in more detail below. In accordance with an embodiment of the invention, the first zone of the membrane 44, e.g., the downstream boundary 52 of the first zone 44 of the membrane, contacts the second zone 47 of the membrane, e.g., the upstream boundary 53 of the second zone 47 of the membrane. In this regard, the membrane may be continuous as described herein.

The first zone of the membrane may have any suitable thickness. In accordance with an embodiment of the invention, the first zone of the membrane may have a thickness as described for that of the first embodiment.

The upstream portion 45 of the first zone 44 of the membrane may comprise the upstream surface 42 of the membrane and a porous downstream boundary 50. The downstream boundary 50 of the upstream portion 45 of the first zone 44 of the membrane may be positioned in the interior of the membrane (e.g., in the interior of the first zone), adjacent to, and continuous with, the upstream boundary 51 of the downstream portion 46 of the first zone 44 of the membrane, which is explained in more detail below.

The upstream portion of the first zone may have any suitable thickness. In accordance with an embodiment of the invention, the upstream portion of the first zone may have a thickness in the range of from less than about 10 µm to greater than about 500 µm, from about 10 µm to about 500 µm, or from about 30 µm to about 200 µm. The upstream portion of the first zone of the membrane may, for example, comprise from less than about 5% to greater than about 95%, from about 5% to about 95%, from about 10% to about 90%, from about 15% to about 85%, from about 20% to about 80%, from about 25% to about 75%, from about 30% to about 70%, from about 35% to about 65%, from about 40% to about 60%, or from about 45% to about 55% of the total thickness of the membrane.

In accordance with an embodiment of the invention, the downstream portion 46 of the first zone 44 of the membrane may comprise a porous upstream boundary 51 and a porous downstream boundary 52. The upstream boundary 51 of the downstream portion 46 of the first zone 44 of the membrane may be positioned in the interior of the membrane (e.g., in the interior of the first zone), adjacent to, and continuous with, the downstream boundary 50 of the upstream portion 45 of the first zone 44 of the membrane. The downstream boundary 52 of the downstream portion 46 of the first zone 44 of the membrane may be positioned at the downstream boundary of the first zone 44, adjacent to, and continuous with, the upstream boundary 53 of the second zone 47 of the membrane, which is explained in more detail below.

The downstream portion of the first zone may have any suitable thickness. In accordance with an embodiment of the invention, the downstream portion of the first zone may have a thickness in the range of from less than about 10 µm to greater than about 500 µm, from about 10 µm to about 500 µm, or from about 30 µm to about 200 µm. The downstream portion of the first zone of the membrane may, for example, comprise from less than about 5% to greater than about 95%, from about 5% to about 95%, from about 10% to about 90%, from about 15% to about 85%, from about 20% to about 80%, from about 25% to about 75%, from about 30% to about 70%, from about 35% to about 65%, from about 40% to about 60%, or from about 45% to about 55% of the total thickness of the membrane.

In accordance with an embodiment of the invention, the membrane further comprises a second, downstream zone 47 comprising pores, an upstream portion 48, and a downstream portion 49. The second zone 47 may also comprise a downstream surface 43 of the membrane and an upstream boundary 53, each of which may be porous. The upstream boundary 53 of the second zone 47 of the membrane may be positioned in the interior of the membrane, adjacent to, and continuous with, the downstream boundary 52 of the first zone 44 of the membrane.

The second zone of the membrane may have any suitable thickness. In accordance with an embodiment of the invention, the second zone of the membrane may have a thickness as described for that of the first embodiment.

In accordance with an embodiment of the invention, the second zone 47 of the membrane comprises an upstream portion 48 and a downstream portion 49. The upstream portion 48 of the second zone 47 of the membrane may comprise a porous upstream boundary 53 and a porous downstream boundary 54. The upstream boundary 53 of the upstream portion 48 of the second zone 47 of the membrane may be positioned in the interior of the membrane, at the upstream boundary of 53 the second zone 47, adjacent to, and continuous with, the downstream boundary 52 of the first zone 44 of the membrane. The downstream boundary 54 of the upstream portion 48 of the second zone 47 of the membrane may be positioned in the interior of the membrane (e.g., in the interior of the second zone), adjacent to, and continuous with, the upstream boundary 55 of the downstream portion 49 of the second zone 47 of the membrane.

The upstream portion of the second zone may have any suitable thickness. In accordance with an embodiment of the invention, the upstream portion of the second zone may have a thickness in the range of from less than about 10 μm to greater than about 400 μm, from about 10 μm to about 400 μm, or from about 30 μm to about 200 μm. The upstream portion of the second zone of the membrane may, for example, comprise from less about 4% to greater than about 85%, from about 4% to about 85%, from about 10% to about 80%, from about 15% to about 75%, from about 20% to about 70%, from about 25% to about 65%, from about 30% to about 60%, from about 35% to about 55%, or from about 40% to about 50% of the total thickness of the membrane.

In accordance with an embodiment of the invention, the downstream portion 49 of the second zone 47 of the membrane comprises an upstream boundary 55 and the downstream surface 43 of the membrane. The upstream boundary 55 of the downstream portion 49 of the second zone 47 of the membrane may be positioned in the interior of the membrane (e.g., in the interior of the second zone), adjacent to, and continuous with, the downstream boundary 54 of the upstream portion 48 of the second zone 47 of the membrane.

The downstream portion of the second zone of the membrane may have any suitable thickness. In accordance with an embodiment of the invention, the downstream portion of the second zone may have a thickness in the range of from less than about 10 μm to greater than about 400 μm, from about 10 μm to about 400 μm, or from about 30 μm to about 200 μm. The downstream portion of the second zone of the membrane may, for example, comprise from less about 4% to greater than about 85%, from about 4% to about 85%, from about 10% to about 80%, from about 15% to about 75%, from about 20% to about 70%, from about 25% to about 65%, from about 30% to about 60%, from about 35% to about 55%, or from about 40% to about 50% of the total thickness of the membrane.

The membrane, including any zones and portions thereof, may be asymmetric as described herein. In this regard, the membrane, and any zones or portions thereof, may have any suitable ratio of asymmetry. In accordance with an embodiment of the invention, the membrane and zones thereof may have a ratio of asymmetry as described for that of the first embodiment. For example, the ratio of asymmetry of the downstream portion of the first zone of the membrane to the upstream portion of the first zone of the membrane may be in the range of from about 1.1 to about 5 and the ratio of asymmetry of the second zone of the membrane to the downstream portion of the first zone of the membrane may be in the range of from about 2 to about 10.

The inventive membranes may be microporous. In this regard, the average pore size of the membrane, including the first and second zones, may be in the range of, for example, from about 0.1 μm to about 10 μm, from about 0.5 μm to about 5 μm, or from about 1 μm to about 3 μm. In accordance with an embodiment of the invention, the downstream portion of the first zone has an average pore size that is greater than an average pore size of the upstream portion of the first zone and greater than an average pore size of an upstream portion of the second zone. Alternatively or additionally, the average pore size of the upstream portion of the first zone and the average pore size of the upstream portion of the second zone are each less than the average pore size of the downstream portion of the first zone. In addition, the average pore size of the first zone is greater than the average pore size of the second zone. Alternatively or additionally, the average pore size of the second zone is less than the average pore size of the first zone. The average pore sizes of the membrane, first and second portions, and first and second zones, may be adjusted as appropriate for the particular application.

All other aspects of the membrane are as described for the first embodiment.

In accordance with a preferred embodiment of the invention, the membrane is an integral multilayer microporous polymeric membrane. In this regard, the membrane includes layers that are bonded together such that the membrane behaves as a single structure that does not delaminate or separate under normal use conditions.

The membrane may comprise any suitable polymer(s). Suitable polymers include, for example, polyaromatics; sulfones (e.g., polysulfones, including aromatic polysulfones such as, for example, polyethersulfone (PES), bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles (including polyalkylacrylonitriles), cellulosic polymers (such as cellulose acetates and cellulose nitrates), fluoropolymers, and polyether ether ketone (PEEK).

The membrane can include a mixture of polymers, e.g., a hydrophobic polymer (e.g., a sulfone polymer) and a hydrophilic polymer (e.g., polyvinylpyrrolidone).

The membrane may be hydrophilic. The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Preferably, the membrane is hydrophilic, having a CWST of about 72 dynes/cm ($72 \times 10^{-5}$ N/cm) or more, more preferably, having a CWST of about 78 dynes/cm (about $78 \times 10^{-5}$ N/cm) or more. Accordingly, the inventive membranes may advantageously be useful for processing (e.g., filtering) a wide variety of fluids, especially aqueous fluids, in a variety of applications, e.g., filtering fluids for the electronics industry, as well as biological, pharmaceutical, food and beverage, and water treatment applications. In an embodiment, the membrane may have a CWST of less than about 72 dynes/cm ($72 \times 10^{-5}$ N/cm), e.g., a CWST from about 60 dynes/cm ($60 \times 10^{-5}$ N/cm) up to about 72 dynes/cm ($72 \times 10^{-5}$ N/cm). The inventive membranes may advantageously also be useful for processing a wide variety of gases in a variety of applications, e.g., air treatment applications.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van der Graff generator, ultraviolet light, electron beam, or to various other forms of radiation, or by surface etching or deposition using a plasma treatment.

In some embodiments, the membrane comprises a pleated membrane.

In another embodiment, a method of using the membrane is provided. For example, a method of processing a fluid according to an embodiment of the invention comprises passing the fluid into the membrane, in a direction from the first zone toward the second zone. In a preferred embodiment, the method comprises passing the fluid through the membrane, in a direction from the first zone toward the second zone.

In accordance with embodiments of the invention, filters and filter elements are also provided, wherein the filter and filter elements comprise at least one membrane according to the invention.

A membrane according to the invention, (as well as filter element comprising at least one membrane) can have any suitable pore structure, e.g., a pore size (for example, as evidenced by porometry (for example, mercury porometry or capillary condensation flow porometry), or by bubble point, or by $K_L$ as described in, for example, U.S. Pat. No. 4,340,479), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The desired pore structure depends on the composition of the fluid to be treated, and the desired effluent level of the treated fluid.

A filter and/or a filter element comprising at least one membrane according to the invention can include additional elements, layers, or components, that can have different structures and/or functions, e.g., at least one of prefiltration, support, drainage, spacing and cushioning. Illustratively, the filter can also include at least one additional element such as a mesh and/or a screen.

The filter, in some embodiments comprising a plurality of filter elements, is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

An embodiment of the invention provides a method of making an asymmetric membrane comprising (a) a first exterior porous surface; (b) a second exterior porous surface; (c) a porous bulk between the first exterior porous surface and the second exterior porous surface, the porous bulk having a first porous region and a second porous region, the first porous region contacting the second porous region; (d) a first asymmetric porous zone, the first asymmetric porous zone including the first exterior surface, and extending into, and including, the first porous region of the bulk; and, (e) a second asymmetric porous zone, the second asymmetric porous zone including the second exterior surface, and extending into, and including, the second porous region of the bulk; wherein the first asymmetric porous zone includes a first porous asymmetry that increases from the first exterior surface through the first porous zone of the bulk, and the second asymmetric porous zone includes a second porous asymmetry that increases from the second exterior surface through the second porous zone of the bulk, and the first porous surface has a first average pore size and the second porous surface has a second average pore size, wherein the first average pore size is larger than the second average pore size.

In a typical embodiment, the method comprises preparing a first solution comprising at least one polymer, at least one solvent, and at least one nonsolvent; preparing a second solution comprising at least one polymer, at least one solvent, and at least one nonsolvent; casting the first solution on a belt to form a first layer; casting the second solution onto the first layer to form a second layer, wherein the second layer is exposed to air; and evaporating the solvent(s) to form the membrane. The first and/or second solutions optionally further comprise at least one initiator.

The second solution may be cast onto the first layer at any suitable time period following the casting of the first layer onto the belt. The time period between casts may vary and can be chosen based on a variety of conditions such as, for example, the speed of the movement of the belt and the distance between extruders. For example, the second solution may be cast onto the first layer from about one second to about two minutes following the casting of the first layer onto the belt, preferably from about six to about nine seconds following the casting of the first layer onto the belt.

The at least one polymer of the first and second solutions may be the same or different, and may be any suitable polymer, such as those described above.

The optional at least one initiator of the first and second solutions may be the same or different, and may be any suitable initiator. Exemplary initiators include any one or more of peroxides, ammonium persulfate, aliphatic azo compounds (e.g., 2,2'-azobis(2-amidinopropane) dihydrochloride (V50)), and combinations thereof.

The at least one solvent of the first and second solutions may be the same or different, and may be any suitable solvent. The polymer may be at least partially soluble in the solvent, and preferably is completely soluble in the solvent. Exemplary solvents include any one or more of dimethyl formamide (DMF), N—N-methylpyrrolidone (NMP), dimethylacetamide (DMAc), N-methylpyrrolidone, tetramethylurea, dioxane, diethyl succinate, dimethylsulfoxide, chloroform, tetrachloroethane, and combinations thereof.

The at least one nonsolvent of the first and second solutions may be the same or different, and may be any suitable nonsolvent (nonsolvents are sometimes referred to as "porogens" or "pore formers"). Exemplary nonsolvents include any one or more of water; acetic acid; glycerin; various polyethylene glycols (PEGs; e.g., PEG-400, PEG-1000); various alcohols, e.g., methanol, ethanol, isopropyl alchohol (IPA), amyl alcohols, hexanols, heptanols, and octanols; alkanes, such as hexane, propane, nitropropane, heptanes, and octane; ketone, ethers and esters such as acetone, butyl ether, ethyl acetate, and amyl acetate; and various salts, such as calcium chloride, magnesium chloride, and lithium chloride; and combinations thereof.

If desired, a solution comprising a polymer can further comprise, for example, minor ingredients such as surfactants and/or release agents. An exemplary release agent is phosphoric acid.

Suitable components of solutions are known in the art. Illustrative solutions comprising polymers, and illustrative solvents and nonsolvents include those disclosed in, for example, U.S. Pat. Nos. 4,964,990, 5,846,422, 5,906,742, 5,928,774; 6,045,899; and 6,146,747.

In accordance with the invention, layers of the membrane can be formed from the same polymer and solvent, varying the viscosity, additives, and treatment, or different polymers can be used for different layers. In an embodiment of the invention, the first solution has a low solid content. In an embodiment of the invention, the second solution has a high solid content.

The solutions comprising the polymers are typically cast into thin films, one on top of the other, and exposed to a gaseous environment for a predetermined period of time, to prepare the membrane by a phase inversion process. The casting thickness of the layers may be the same as or different from the thickness of the zones of the membrane that is ultimately formed. For example, in some embodiments, the thickness of the zones of the membrane that is ultimately formed may be up to 50% the thickness of the casting layers. Preferably, the first solution is spread in a layer onto a support (such as a nonporous support), and the second solution is spread in a layer onto the first solution, and the membrane can be later separated from the support after precipitation. However, the support can be incorporated into the final structure if desired. In an embodiment of the invention, the membrane may be used for diagnostic applications. In this regard, membrane may comprise a non-removable, nonporous support.

The membranes can be cast manually (e.g., poured, cast, or spread by hand onto a casting surface) or automatically (e.g., poured or otherwise cast onto a moving bed). One example of a suitable support is polyethylene coated paper.

A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the first and second solutions comprising polymers can be separately cast by means of a doctor blade with knife gaps in the range from about 120 micrometers to about 500 micrometers, more typically in the range from about 180 micrometers to about 400 micrometers. The knife gaps can be different for the first and second solutions.

In a preferred embodiment, the method comprises heating the first and second layers. The first and second layers may be heated, for example, by controlling the temperature of the belt on which the first layer is cast. The first and second layers may be heated to any suitable temperature. For example, the first and second layers may be heated to a temperature of about 60 to about 150° F. (about 15 to about 66° C.). Heating the first and second layers may move the solvent(s) from and through the first and second layers to the gaseous environment (e.g., air). The portion of the first layer that is farthest from the belt and closest to the second layer may be rich in nonsolvents, and this may provide a first average pore size that is larger than a second average pore size, e.g., an average pore size that is greater than the average pore size of the upstream portion of the first zone and greater than an average pore size of an upstream portion of the second zone of the membrane. Heating may solidify the first layer and provide the first zone of the membrane having an average pore size that is greater than the average pore size of the second zone.

Preferably, the method comprises casting the second solution onto the first layer to form a second layer, wherein the second layer is exposed to a gaseous environment, e.g., air. In an embodiment, the air may be humid air with a relative humidity of about 60% to about 98%. The humidity may be adjusted as appropriate. The solvent(s) evaporate from the second layer and provide the second zone of the membrane. Humidity of the air in contact with the second layer may provide a second zone of the membrane having an average pore size that is less than the average pore size of the first zone.

In an embodiment of the invention, a top portion of the first layer may mix with a bottom portion of the second layer at the interface of the first and second layers to provide a third layer that comprises a mixture of the first and second layers.

The set membrane is leached to remove the solvent and other soluble ingredients.

Another embodiment of the invention provides a method of making a membrane comprising a first, upstream zone comprising pores, an upstream portion, and a downstream portion; and a second, downstream zone comprising pores, an upstream portion, and a downstream portion, wherein the pores of the first zone have an average pore size that increases in an upstream to downstream direction, the pores of the second zone have an average pore size that increases in a downstream to upstream direction, the downstream portion of the first zone has an average pore size that is greater than an average pore size of the upstream portion of the first zone and greater than an average pore size of an upstream portion of the second zone, and the average pore size of the first zone is greater than the average pore size of the second zone. The method is as described herein with respect to other aspects of the invention.

Figure 1:
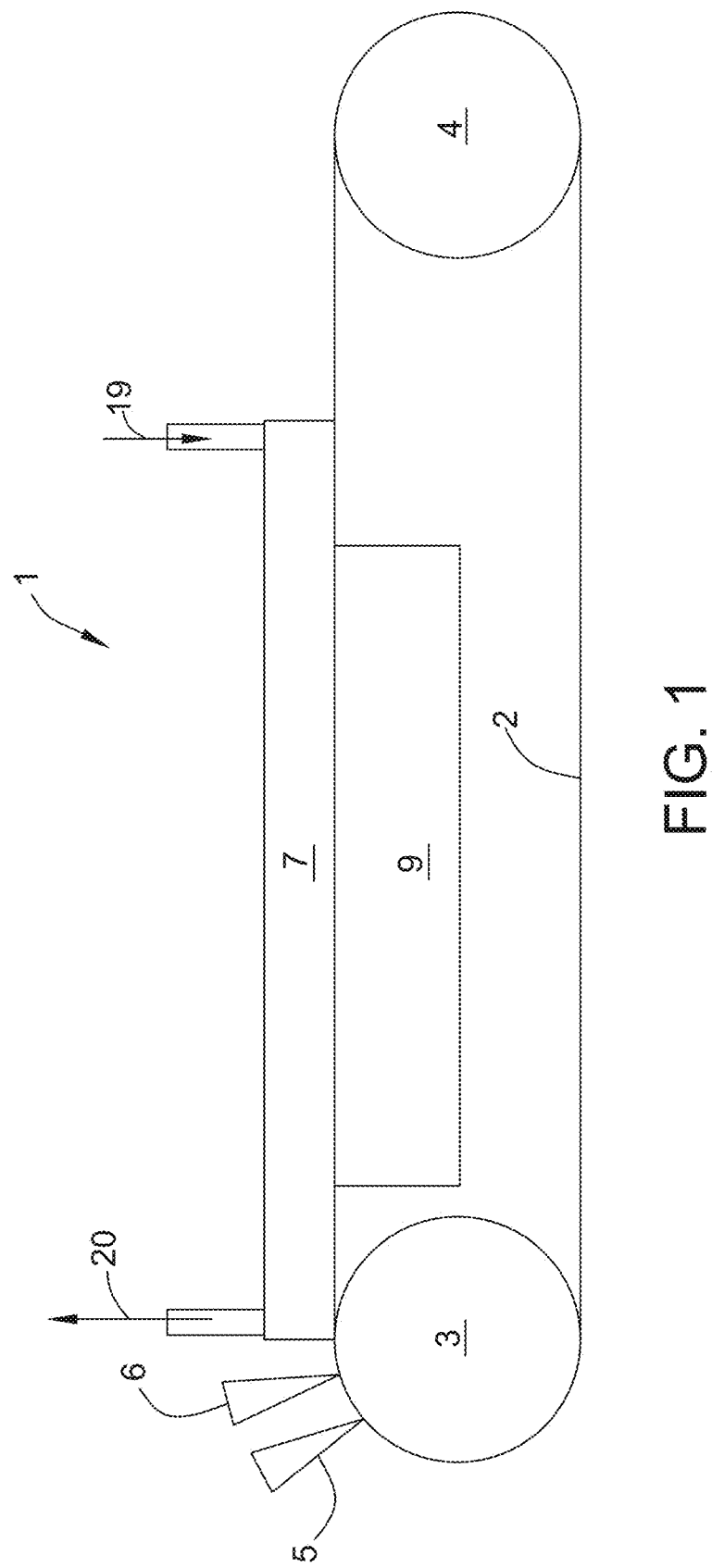
FIG. 1 shows an illustrative generalized system for casting membranes according to an embodiment of the invention, showing first and second extruders, a chamber, a belt spray zone, and first and second rolls.

The membranes of the invention may be made using any suitable system. FIG. 1 shows an illustrative generalized system 1 for casting membranes according to an embodiment of the invention. The system 1 comprises a belt 2, first 3 and second 4 rolls, first 5 and second 6 extruders, chamber 7, and belt spray zone 9. Chamber 7 comprises air inlet 19 and air outlet 20. In an embodiment of the invention, the chamber 7 and/or belt spray zone 9 may comprise one or more compartments and/or the system can comprise one or more chambers and/or belt spray zones. In some embodiments wherein the chamber comprises one or more compartments and/or the system comprises one or more chambers, additional compartments and/or chambers may comprise air inlets and air outlets. The extruders or knives may be any suitable distance apart from one another. For example, the extruders may be about ten inches (25.4 cm) to about 250 inches (635 cm) apart from one another. Preferably, the extruders are about ten inches (25.4 cm) to about twelve inches (30.48 cm) apart from one another. In some embodiments, the knives are about one inch (2.54 cm) to two inches (5.08 cm) apart from one another, preferably from about 1.25 inches (3.175 cm) to about 1.5 inches (3.81 cm) apart from one another.

An embodiment of the method of casting the membrane is described with reference to FIG. 1 as follows: The first solution is cast onto belt 2 using first extruder 5 to form a first layer. The second solution is cast onto the first layer using second extruder 6 to form a second layer on the first layer to provide a pre-membrane comprising the first and second layers. Rotation of the first and second rolls 3, 4 moves belt 2, which carries the pre-membrane through the chamber 7, where the pre-membrane is exposed to air. Air circulates through the chamber 7 via air inlets 18 and air outlet 20. The temperature of the belt may be controlled using belt spray zone 9. The solvent evaporates from the pre-membrane in the chamber to form a membrane. Belt 2 carries the membrane onto the second roll 4.

In some embodiments in which the chamber has first and second portions, the process conditions may generally be as follows. The belt speed may be, e.g., in the range from about 10 to about 120 inches (about 25.4 to about 304.8 cm) per minute. The belt spray temperature in the first and second portions of the chamber may be, e.g., in the range from about 24° C. to about 65° C., and the air velocity in the first and second portions of the chamber may be, e.g., in the range of from about 200 to about 1000 feet (about 60.96 to about 304.8 meters) per minute. The dew point in the first and second portions of the chamber may be, e.g., in the range of from about 14° C. to about 30° C., and the dry bulb temperature in the first and second portions of the chamber may be, e.g., in the range of from about 16° C. to about 32° C.

The pore sizes of the membrane may be controlled by varying any one or more process conditions or the composition of the solution(s) used to make the membrane. For example, the pore size may be decreased by increasing the dew point, decreasing the dryness, increasing the air velocity, increasing the air volume, and/or increasing the relative humidity of the environment in which the membrane is formed, and/or by decreasing the belt spray temperature and/or changing the belt spray pattern. Alternatively, or additionally, the pore size may also be decreased by, for example, increasing the polymer (PES, PVDF, etc) concentration, decreasing the solvent (e.g., NMP, DMF) concentration, and/or changing the molecular weight of the pore former (e.g., PEG). The pore size may be increased by, for example, decreasing the dew point, increasing the dryness, decreasing the air velocity, decreasing the air volume, and/or decreasing the relative humidity of the environment in which the membrane is formed, and by increasing the belt spray temperature and/or changing the belt spray pattern. Alternatively, or additionally, the pore size may also be increased by, for example, decreasing the polymer (PES, PVDF, etc) concentration, increasing the solvent (e.g., NMP, DMF) concentration, and/or changing the molecular weight of the pore former (e.g., PEG).

Typically (not shown), the membrane passes from the second roll 4 and into one or more leaching tanks to remove the solvent and other soluble ingredients, passed into an oven, where it is dried, and rolled onto another roll, as is known in the art.

The following examples further illustrate the invention but, of course, should not be construed as in any way limiting its scope.

Example 1

This example demonstrates a method of making an asymmetric membrane according to an embodiment of the invention.

Solutions A and B are separately prepared containing the components set forth in Table 1. Briefly, the components of each solution are mixed and subsequently degassed under vacuum.

TABLE 1

| Component | Weight Percent Solution A | Weight Percent Solution B |
| --- | --- | --- |
| Polyethylene Glycol, (PEG-E400) | 58~70 | 60~75 |
| PEG-400 Dimethacrylate (DIMAC) | 0.0~1.5) | 0.0~1.5 |
| PEG-400 monomethacrylate (MONOMAC) | 0.0~1.5 | 0.0~1.5 |
| Ammonium Persulfate (initiator) | 0.01~0.5 | 0.01~0.5 |
| Water (nonsolvent) | 0.5~3.5 | 0.5~3.5 |
| Polyethersulfone (PES) (ULTRASON ™ E, BASF Corporation, Florham Park, NJ) | 11~14 | 8.5~11.5 |
| Dimethyl formanide (DMF) (solvent) | 0~17 | 0~17 |
| Glycerin (nonsolvent) | 0~4 | 0~9 |
| N-N-methyl pyrrolidone (NMP) (solvent) | 0~17) | 0~17 |
| Phosphoric Acid (processing aid) | — | 0~1 |

Solution B is continuously cast onto a belt in a casting box at room temperature using a first doctor blade. Solution B has a casting thickness of about 8 mils (203 µm). Approximately 1 second later, Solution A is continuously cast onto Solution B using a second doctor blade that is located 1.25 inches (3.175 cm) from the first doctor blade. Solution A has a casting thickness of about 5 mils (127 µm). The solutions pass through the first and second portions of the chamber under the following conditions until the membrane forms. The belt speed is 90 inches (228.6 cm) per minute. In the first portion of the chamber, the belt spray temperature is 46.4° C., the air velocity is 600 feet (182.88 meters) per minute, the dry bulb temperature is 28.4° C., and the dew point is 25.2° C. In the second portion of the chamber, the belt spray temperature is 38.8° C., the air velocity is 580 feet (176.78 meters) per minute, the dry bulb temperature is 26.7° C., and the dew point is 25° C.

The membrane is collected at the end of the production belt. The membrane is then leached with deionized (DI) water overnight to remove water-soluble chemicals. The membrane is then washed in 40% ethanol (remainder water) for 2 hours to remove organic chemicals. The membrane is then washed in 80° C. DI water for 30 minutes. The washed membrane is then dried in an oven at 65° C. for 30 minutes.

The membrane is internally hydrophilic. A SEM photograph of a vertical cross-section of the membrane is shown in FIG. 2A.

The nominal pore size (i.e., cut-off particle size) of the membrane is 0.2 µm. The upstream portion of the first zone of the membrane has an average pore size of 0.5 to 5 µm. The downstream portion of the first zone of the membrane has an average pore size of 2 to 10 µm. The second zone of the membrane has an average pore size of 0.01 to 0.5 µm.

Example 2

This example demonstrates that an asymmetric membrane produced in accordance with Example 1 is water permeable.

The membrane prepared according to Example 1 is tested for water permeability at 10 pounds per square inch (psi) (68.95 kPa). The water permeability of the membrane is measured to be 20.3 ml/min/cm$^2$ at 10 psi (68.95 kPa) at 29° C.

Example 3

This example demonstrates that an asymmetric membrane produced in accordance with Example 1 provides an increased capacity as compared to a V-shaped asymmetric membrane.

A membrane prepared in a first batch according to Example 1 is tested for membrane capacity and compared to that of a V-shaped asymmetric membrane (SUPOR asymmetric PES C-200 membrane (Part Number S80803), Pall Corporation, Port Washington, N.Y.) as a control. A 1% treacle solution is prepared (5 grams treacle (Lyle's black Treacle, Notts, UK); dissolved in 495 grams deionized water (DI)). The membranes are placed in test cells, the test system is purged, and the throughput is determined by determining the total volume collected for five minutes at 3 psi. The results are shown in Table 2.

TABLE 2

|  | 1% Treacle Throughput at 5 minutes (mL) |
| --- | --- |
| Membrane of Example 1 | 75 |
| V-shaped pore structure Asymmetric Membrane | 35 |

A membrane prepared in a second batch according to Example 1 is tested for membrane capacity. The membrane capacity is tested using 1% treacle solution and compared to that of a V-shaped asymmetric membrane (SUPOR asymmetric PES C-200 membrane (Part Number S80803), Pall Corporation, Port Washington, N.Y.) as a control. The throughput is determined by determining the total volume collected for each of the time periods set forth in Table 3 at 3 psi. The results are shown in Table 3.

TABLE 3

|  | 1% Treacle Throughput (ml) | | | | | |
| --- | --- | --- | --- | --- | --- | --- |
|  | 1 minute | 2 minutes | 3 minutes | 4 minutes | 5 minutes | 10 minutes |
| Membrane of Example 1 | 43 | 56 | 64 | 70 | 74 | 85 |
| V-shaped pore structure Asymmetric Membrane | 35 | 40 | 44 | 46 | 48 | 54 |

As shown in Tables 2 and 3, the membrane of Example 1 demonstrates an increased capacity as compared to the V-shaped pore structure membrane.

Example 4

This example demonstrates making an asymmetric membrane according to another embodiment of the invention.

Solutions A and B are separately prepared containing the components set forth in Table 4. Briefly, the components of each solution are mixed and subsequently degassed.

TABLE 4

|  | Weight Percent | |
| --- | --- | --- |
| Component | Solution A | Solution B |
| Polyethylene Glycol, (PEG-E400) | 60~75 | 58~70 |
| PEG-400 Dimethacrylate (DIMAC) | 0.01~1.0 | 0.01~1.0 |
| Tetraacrylate (pentaerythritol tetraacrylate) (crosslinker) | 0.01~1.0 | 0.01~1.0 |
| Hydroxyethylmethacrylate (2-HEMA) | 0.01~0.25 | 0.01~0.25 |

TABLE 4-continued

|  | Weight Percent | |
| --- | --- | --- |
| Component | Solution A | Solution B |
| 2,2-Azobis(2-amidinopropane) dihydrochloride (V50) (initiator) | 0.01~0.2 | 0.01~0.2 |
| Water (nonsolvent) | 0~3 | 0~3 |
| Polyethersulfone (PES) (ULTRASON ™ E, BASF Corporation, Florham Park, NJ) | 7~10.5 | 11~14 |
| Dimethyl formanide (DMF) (solvent) | 0~17 | 0~17 |
| Glycerin (nonsolvent) | 0~9 | — |
| N-N-methyl pyrrolidone (NMP) (solvent) | 0~17 | 0~17 |

Solution A is continuously cast onto a production scale belt in a casting box at room temperature using a first doctor blade. Solution A has a casting thickness of about 8 mils (200 µm). Approximately 4.5 seconds later, Solution B is continuously cast onto Solution A using an extruder located approximately 4.5 inches (11.43 cm) from the first doctor blade. Solution B has a casting thickness of about 5 mils (125 µm). The solutions pass through the first and second portions of the chamber under the following conditions until the membrane forms. The belt speed is 90 inches (228.6 cm) per minute. In the first portion of the chamber, the belt spray temperature is 42.8° C., the air velocity is 365 feet (111.25 meters) per minute, the dry bulb temperature is 26.7° C., and the dew point is 25.3° C. In the second portion of the chamber, the belt spray temperature is 36.1° C., the air velocity is 300 feet (91.44 meters) per minute, the dry bulb temperature is 26.7° C., and the dew point is 25.6° C.

The membrane passes through a first leaching tank containing room temperature reverse osmosis (RO) water, then through a second leaching tank containing 40% ethanol (remainder water), followed by a third leaching tank containing 80° C. RO water. The washed membrane is then dried in an oven at 65° C.

The membrane is internally hydrophilic. A SEM photograph of a vertical cross-section of a membrane prepared in a first batch that is prepared according to this Example is shown in FIG. 3. An enlarged scanning electron microscope (SEM) photograph of the lateral, second exterior surface of a membrane prepared in a second batch that is prepared according to this Example is shown in FIG. 4A. An enlarged SEM photograph of the lateral, first exterior surface of the membrane prepared in the second batch is shown in FIG. 4B.

Example 5

This example demonstrates the performance of an asymmetric membrane prepared in accordance with Example 4.

Two batches (BN 089031 and BN 089067) of a membrane prepared according to Example 4 are tested for performance including water permeability as described in Example 2, membrane capacity as described in Example 3, water flow rate (WFR), and bubble point (KL). Membrane characteristics, including thickness and wettability, are also measured. The results are shown in Table 5.

TABLE 5

| Performance/Characteristic | BN 089031 | BN 089067 |
|---|---|---|
| 1% Treacle Throughput (mL at 5 min.) | 73.6 ± 16.5 | 66.8 ± 10.3 |
| KL in psi (kPa) | 64.8 ± 4.3 (446.78 ± 29.65) | 64.1 ± 3.3 (441.95 ± 22.75) |
| WFR (mL/min/cm$^2$) | 40.3 ± 6.6 | 42.5 ± 7.5 |
| Thickness (mils) | 8.6 ± 1.0 (218 ± 25 μm) | 7.3 ± 0.6 (185 ± 25 μm) |
| Wettability in dynes/cm (mN/m) | 91.2 | 91.2 |

Example 6

This example demonstrates the average pore size of the second zone and the upstream and downstream portions of the first zone of a membrane with a 0.45-0.65 μm nominal pore size.

The nominal pore size of the membrane is 0.45-0.65 μm. The upstream portion of the first zone of the membrane has an average pore size of 1 to 10 μm. The downstream portion of the first zone of the membrane has an average pore size of 3 to 20 μm. The second zone of the membrane has an average pore size of 0.01 to 1 μm.

Example 7

This example demonstrates a method of making an asymmetric membrane according to another embodiment of the invention.

Solutions A and B are separately prepared containing the components set forth in Table 6. Solutions A and B are heated in a water bath at 63° C. prior to casting.

TABLE 6

| Component | Weight Percent | |
|---|---|---|
| | Solution A | Solution B |
| N-N-methyl pyrrolidone (NMP) | 25~40 | 25~40 |
| Ethyl Glycol | 5~12 | 5~12 |
| KYNAR 761 PVDF | 9~12 | 12~17 |
| KYNAR 7201 PVDF/30% Tetrafluoroethylene copolymer | 3~8 | — |
| Acetone | 25~40 | 25~40 |
| Methyl acetate | 7~12 | 7~12 |
| DC193-C (DABCO ® DC193 Surfactant) | — | 0.05~5 |

Solution B is continuously cast onto a plate at room temperature (25° C.) using a first knife. Solution B has a casting thickness of about 16 mils (406 μm). Solution A is continuously cast onto Solution B using a second knife located 1.5 inches (3.81 cm) from the first knife. Solution A has a casting thickness of about 6 mils (152 μm). The first and second knives are pushed to cast along the plate at a speed of 1.07 inches (2.72 cm) per second. Once the membrane is cast, the plate is transferred to a chamber. The temperature in the chamber is controlled according to steps 1-4 in Table 7 until the membrane forms.

TABLE 7

| Step | Chamber Temperature (° C.) | Time (Mins) |
|---|---|---|
| 1 | 15~35 | 0.5~3 |
| 2 | 50~70 | 2~6 |
| 3 | 15~35 | 0.5~3 |
| 4 | 25~45 | 0.5~7 |

The membrane is washed for 10 minutes in hot water, then 40% ethanol (remainder water) for 30 minutes on a shaker. Then membrane is rinsed with cold water for 10 minutes. The membrane is dried overnight at room temperature.

The membrane is internally hydrophilic. A SEM photograph of a vertical cross-section of the membrane is shown in FIG. 5A.

Example 8

This example demonstrates the structure of another asymmetric membrane according to an embodiment of the invention.

The structure of a PES asymmetric membrane according to an embodiment of the invention is shown in the SEM photograph of FIG. 6A. FIG. 6B is an enlarged SEM photograph of the vertical cross section at area 60 in the first zone of the membrane of FIG. 6A. FIG. 6B shows an average pore size in area 60 that is larger than that of the second zone (e.g., 62 (FIG. 6D)). FIG. 6C is an enlarged SEM photograph of the vertical cross section at area 61 spanning the first and second zones of the membrane of FIG. 6A. FIG. 6D is an enlarged SEM photograph of the vertical cross section at area 62 in the second zone of the membrane of FIG. 6A. FIG. 6D shows an average pore size in area 62 that is smaller than that of the first zone (e.g., 60 (FIG. 6B)).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An asymmetric membrane comprising
    (a) a first exterior porous surface;
    (b) a second exterior porous surface;
    (c) a porous bulk between the first exterior porous surface and the second exterior porous surface, the porous bulk having a first porous region and a second porous region, the first porous region contacting the second porous region;
    (d) a first asymmetric porous zone, the first asymmetric porous zone including the first exterior porous surface and a first asymmetric porous zone boundary in the porous bulk, and extending into, and including, the first porous region of the bulk to the first asymmetric zone boundary; and,
    (e) a second asymmetric porous zone, the second asymmetric porous zone including the second exterior porous surface and a second asymmetric porous zone boundary in the porous bulk, and extending into, and including, the second porous region of the bulk to the second asymmetric zone boundary;
    wherein the first asymmetric porous zone includes a first porous asymmetry that increases from the first exterior porous surface through the first porous region of the bulk to the first asymmetric zone boundary, and the second asymmetric porous zone includes a second porous asymmetry that increases from the second exterior porous surface through the second porous region of the bulk to the second asymmetric zone boundary, and the first exterior porous surface has a first average pore size and the second exterior porous surface has a second average pore size, wherein the first average pore size is larger than the second average pore size;
    wherein the first porous asymmetry has a ratio of asymmetry from the first exterior porous surface to the first asymmetric zone boundary in the range of from about 1.1 to about 5, and the second porous asymmetry has a ratio of asymmetry from the second exterior porous surface to the second asymmetric zone boundary in the range of from about 2 to about 10.

2. A membrane comprising:
    a first, upstream porous zone comprising a first zone upstream porous portion, and a first zone downstream porous portion; and
    a second, downstream porous zone comprising a second zone upstream porous portion, and a second zone downstream porous portion, wherein
    the first zone having an average pore size that increases in an upstream to downstream direction,
    the second zone having an average pore size that increases in a downstream to upstream direction,
    the first zone downstream porous portion having an average pore size that is greater than an average pore size of the first zone upstream porous portion, and greater than an average pore size of the second zone upstream porous portion, and
    the average pore size of the first zone is greater than the average pore size of the second zone.

3. The membrane of claim 1, wherein the first zone has a thickness of about 10 µm to about 500 µm.

4. The membrane of claim 1, wherein the second zone has a thickness of about 10 µm to about 400 µm.

5. The membrane of claim 1, wherein the membrane has a pore size ratio of about 1.1 to about 100.0.

6. The membrane of claim 1, wherein the first zone has an average pore size of 0.2 µm to 10.0 µm.

7. The membrane of claim 1, wherein the second zone has an average pore size of 0.01 µm to 5.0 µm.

8. The membrane of any claim 1, comprising a pleated membrane.

9. A method of processing a fluid, comprising passing the fluid into the membrane of claim 1, in a direction from the first zone toward the second zone.

10. The method of claim 9, comprising passing the fluid through the membrane.

* * * * *